United States Patent
Yamaguchi

(10) Patent No.: US 7,236,256 B2
(45) Date of Patent: Jun. 26, 2007

(54) RANGE FINDER AND METHOD

(75) Inventor: Yoshinori Yamaguchi, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 391 days.

(21) Appl. No.: 10/721,457

(22) Filed: Nov. 26, 2003

(65) Prior Publication Data
US 2004/0130731 A1   Jul. 8, 2004

(30) Foreign Application Priority Data
Dec. 11, 2002 (JP) ............................. 2002-359809
Mar. 20, 2003 (JP) ............................. 2003-079167

(51) Int. Cl.
G01B 11/24 (2006.01)
G01B 11/30 (2006.01)
G01C 3/08 (2006.01)
G01C 5/00 (2006.01)
G01C 3/00 (2006.01)
G01N 21/86 (2006.01)
G01V 8/00 (2006.01)

(52) U.S. Cl. ................. 356/603; 356/601; 356/3.01; 356/4.01; 250/559.22; 250/559.29; 250/559.38

(58) Field of Classification Search .............. None
See application file for complete search history.

(56) References Cited

U.S. PATENT DOCUMENTS 3,788,741 A * 1/1974 Buechler .................. 356/4.06
4,641,972 A * 2/1987 Halioua et al. .............. 356/604
2005/0089199 A1 * 4/2005 Marschner et al. .......... 382/118

FOREIGN PATENT DOCUMENTS

JP    A 2002-162208       6/2002
JP    2002213931 A *      7/2002

OTHER PUBLICATIONS

Chu-Song Chen et al., "Range data acquisition using color structured lighting and stereo vision," Image and Vision Computing 15, pp. 445-456, 1997.

* cited by examiner

Primary Examiner—Gregory J. Toatley, Jr.
Assistant Examiner—Gordon J. Stock, Jr.
(74) Attorney, Agent, or Firm—Oliff & Berridge, PLC

(57) ABSTRACT

A linearly polarized light projector system projects linearly polarized light onto a subject. While polarizing filters are used for removing light specular-reflected on the subject, a reflected image after removal of the specular-reflected light is captured by image input systems different in view point. Even in the case where the subject is glossy, the number of points for measuring the shape of the subject is increased and range images improved in measurement accuracy can be acquired collectively.

12 Claims, 14 Drawing Sheets

ENCODED PATTERN LIGHT

FIG. 3
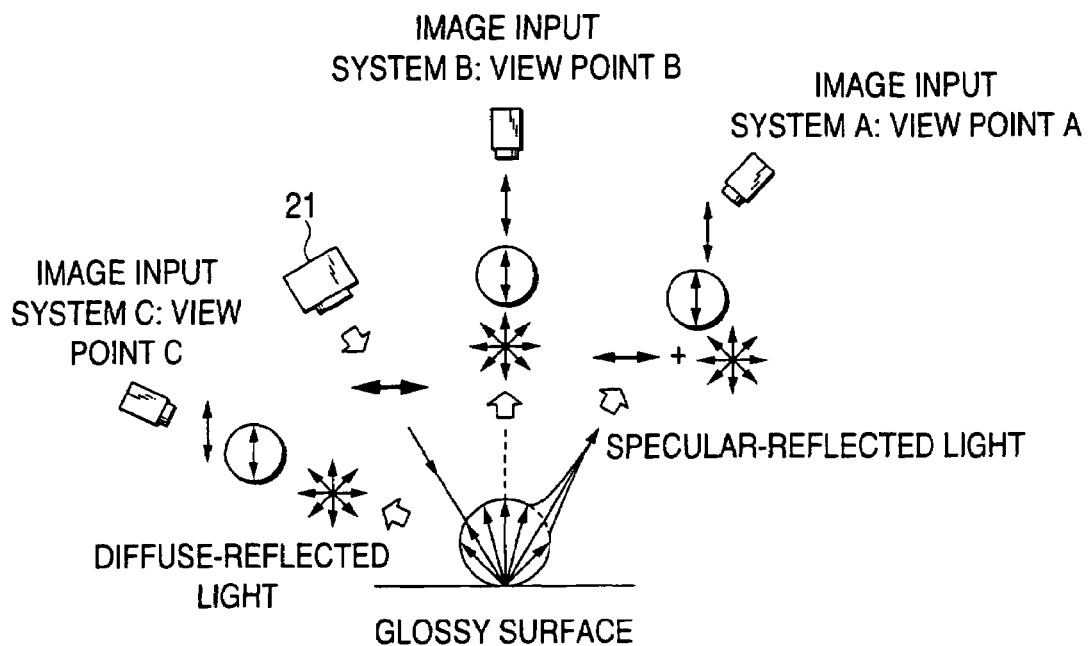
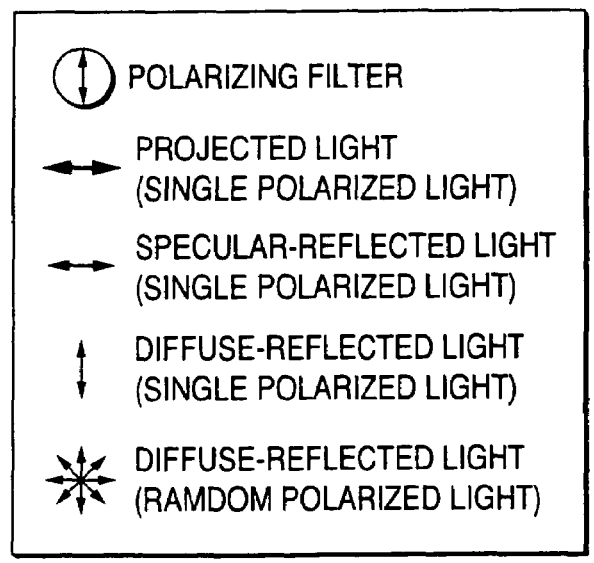

ENCODED PATTERN LIGHT

ENCODED STRIPE PATTERN LIGHT

RANGE FINDER AND METHOD

BACKGROUND OF THE INVENTION

1. Field of the Invention

The present invention relates to a three-dimensional (hereinafter referred to as 3D) image acquired apparatus and method for acquiring range image in addition to intensity image by a triangulation method. The invention is aimed at increasing the number of measurement points and improving measurement accuracy by use of a polarizing optical system.

2. Description of the Related Art

A method for measuring the shape of a subject is roughly classified into a passive method (triangulation method, shape from X) and an active method (time of flight method, triangulation method). The different between the passive method and the active method is based on whether some energy is applied on the subject or not. It is generally said that the active method is a measuring method more robust against noise than the passive method because the active method can eliminate ambiguity from measurement.

The triangulation method used in each of the passive and active methods is a geometrical method in which a distance to a measurement point on a subject is obtained on the basis of the length of a base line and angles between the base line and lines connecting opposite ends of the base line to the measurement point on the subject. As the triangulation method used in the active method, there has been proposed a measuring method called "multi-pattern projecting method" in which encoded stripe pattern light with a plurality of stripes is projected as disclosed in "Chu-Song Chen, "Range data acquisition using color structured lighting and stereo vision", Image and Vision Computing 15, pp. 445-456, 1997".

FIG. 11 is a configuration diagram showing this measuring method. In FIG. 11, light with a plurality of stripes encoded in accordance with the intensity or color of the light is projected onto a subject 12 by a projector system 11, so that the shape of the subject 12 is measured collectively by two eyes' stereoscopic vision. A reflected image with a plurality of stripes reflected on the subject 12 is captured by a first image input system 13 and a second image input system 14 which are disposed in the left and right of the projector system 11 respectively. Two images acquired by the image input systems 13 and 14 are compared with each other to thereby decide corresponding points on the subject 12. When the corresponding points are decided, the distance to the subject 12 can be obtained by the aforementioned geometrical method.

Natural light (random polarized light) having various polarizing directions as shown in FIG. 12 is used as the projected light. In this case, if a subject high in specular gloss such as a glossy substance is used, a spatial distribution of reflection of light is biased greatly because a measurement surface is deviated largely from perfect diffuse reflection. As a result, the reflected images captured by the left and right image input systems are widely different in intensity value from each other though the reflected striped images are formed from the same striped light. When, for example, the image input systems are located on view points A, B and C respectively, the view point A (in a direction of specular reflection) contains both specular-reflected light high in reflected light intensity and diffuse-reflected light whereas each of the view points B and C contains only diffuse-reflected light. Accordingly, in the method in which striped images acquired by the left and right image input systems are compared with each other so that corresponding points on the subject are decided on the basis of the intensity difference between the striped images, there arises a problem that a great deal of mistaken correspondence occurs or such corresponding points cannot be found.

FIG. 13 is a configuration diagram of an apparatus using polarizing filters in order to remove the specular-reflected light. In this configuration, randomness of the projected light provided as random polarized light is, however, retained in the specular-reflected light observed at the view point A located in a direction of specular reflection. Accordingly, the specular-reflected light cannot be removed, no matter how possibly each polarizing filter is rotated to be adjusted. Hence, in the present circumstances, the aforementioned problem cannot be solved.

Reflected images acquired by the image input systems B and C become substantially equal to each other. If two image input systems are set in this layout, there is some case where mistaken correspondence is reduced. It is however impossible to adapt this configuration to the case where the subject has a plurality of inclinations to bring a limit to the layout of image input systems. When the spread in a spatial distribution of specular-reflected light shifts from the case of a relatively narrow spread shown in FIGS. 12 and 13 (a glossy substance high in specular gloss) to the case of a broad spread (a glossy substance low in specular gloss), mistaken correspondence occurs because part of specular-reflected light is observed in the image input system B. The case where this configuration can be adapted to the reduce of mistaken correspondence is in a very narrow range. That is, this configuration is not realistic.

This example has been described on the case where two image input systems are provided. The same problem as described above arises also in the configuration where one image input system is provided for one projector system. That is, because the intensity of a pattern reflected image varies according to the view point of the image input system and the inclination of a surface of the subject, correspondence between the projected light and the reflected image captured cannot be obtained. There arises a problem that a great deal of mistaken correspondence occurs or corresponding points cannot be found.

The same problem as described above arises also in the case where an image input system having a principal point identical to that of the projector system is used. Before description of this problem, a problem arising in the case where an image input system has a principal point not identical to that of the projector system will be described. FIG. 14 is a diagram showing the configuration in which the image input system has a principal point not identical to that of the projector system. In FIG. 14, light with a plurality of stripes encoded by the color or intensity of the light is projected onto a subject 12 by the projector system 11. The striped light on the subject 12 is monitored by the image input system 15. The intensity value of the projected striped light is compared with that of the captured striped image to find the same and one stripe pattern to thereby calculate a distance according to the trigonometrical theory.

The case where the subject has a textured surface (such as a colored surface or a patterned surface) and the case where the subject has a glossy surface (exhibiting a biased intensity distribution of reflected light) will be described. First, when the subject has a textured surface, the captured striped image is affected by the textured surface of the subject. As a result, the color/brightness of the captured striped image becomes different from that of the projected striped light, so that it is difficult to judge correspondence between the captured striped image and the projected striped light. Accordingly, mistaken correspondence occurs, so that the distance to the subject cannot be calculated. To solve this problem, an image input system is provided in a position identical to the position of the principal point of the projector system 11. FIG. 15 shows this configuration. In FIG. 15, texture information is acquired by the identical principal point image input system 16. Because each of striped images captured by the identical principal point image input system 16 and the nonidentical principal point image input system 15 contains texture information of the subject, occurrence of error can be suppressed when corresponding points are extracted on the basis of comparison between the two striped images. Accordingly, the influence of texture of the subject on deterioration of measurement can be reduced. In addition, the texture information per se can be acquired accurately, so that a 3D image with texture can be acquired.

In this manner, the influence of texture can be considerably lightened by the provision of the image input system having a principal point identical to that of the projector system. As described above, it is however impossible to adapt this configuration to the case where the subject has a glossy surface.

As the related art related to the invention, there is a method in which a polarizing filter is provided between a subject and a camera to prevent unnecessary light from entering the camera when an light-section line is used for measuring the 3D shape of the subject, as disclosed in JP-A-2002-162208.

SUMMARY OF THE INVENTION

An object of the invention is to provide a range finder and method in which the number of points for measuring a range image of a subject is increased and measurement accuracy is improved even in the case where the subject is glossy.

To achieve the foregoing object, in accordance with an aspect of the invention, there is provided a range finder including: a projector unit for projecting linearly polarized light onto a subject; one or more image input units each disposed in a position different in principal point from the projector unit; and a polarizing direction selection unit for selecting light having a polarizing direction from light reflected by the subject.

Each of the one or more image input units captured a reflected image based on the light selected by the polarizing direction selection unit from the light reflected by the subject and measures a 3D shape of the subject on the basis of the reflected image.

In this configuration, because the light projected onto the subject is linearly polarized light, the intensity of the reflected light can be restrained from varying according to the direction of a normal line to a surface of the subject and the position of the image input unit. For example, a polarizing filter can be used as the polarizing direction selection unit. The polarizing filter may be replaced by an optical member which is a reflection type polarizing direction selection unit. Examples of the optical member include a PBS prism, and a wire grid.

In this configuration, one of the image input units may be set as an identical principal point image input unit having a principal point identical to that of the projector unit, so that the identical principal point image input unit captures a reflected image based on the light selected by the polarizing direction selection unit from the light reflected by the subject.

In the case where a pattern having a plurality of stripes is projected, one of the image input units may be set as an image input unit having a principal point shifted in a direction of the length of the stripes from the principal point of the projector unit but substantially identical to the principal point of the projector unit so that a reflected image can be captured without use of any beam splitter such as a half mirror to avoid the problem of intensity difference caused by the beam splitter, so that the shifted image input unit captures a reflected image based on the light selected by the polarizing direction selection unit from the light reflected by the subject. Preferably, two or more projector units maybe provided so that the projector units are arranged in the direction of the length of the stripes.

The range finder may further includes an angle adjustment unit for changing an angle of the polarizing direction selected by the polarizing direction selection unit, relative to the polarizing direction of the linearly polarized light. For example, the angle adjustment unit may include either or both of a rotation mechanism for rotating the projector unit and a rotation mechanism for rotating the polarizing direction selection unit.

For example, the polarizing direction selected by the polarizing direction selection unit is substantially perpendicular to the polarizing direction of the linearly polarized light in terms of angle.

Preferably, a reflected image based on light after specular-reflected light contained in the light reflected by the subject is removed by the angle adjustment unit is captured.

For example, the projector unit may include a light source, a light forming optical system, and a polarized light conversion optical system or may include a light source, a light forming optical system, and a polarizing filter.

For example, a polarizing filter is used as the polarizing direction selection unit.

Preferably, pattern light with a plurality of stripes encoded by use of the linearly polarized light may be projected.

The invention can be applied to a method as well as to an apparatus or system.

The aforementioned aspect and other aspects of the invention will be described in claims and explained in detail in connection with the following embodiments.

BRIEF DESCRIPTION OF THE DRAWINGS

These and other objects and advantages of this invention will become more fully apparent from the following detailed description taken with the accompanying drawings in which:

FIG. 3 is a diagram for explaining a mechanism of reducing measurement error in this embodiment;

DETAILED DESCRIPTION OF THE PREFERRED EMBODIMENTS

Embodiments of the invention will be described below specifically with reference to the drawings.

Figure 1:
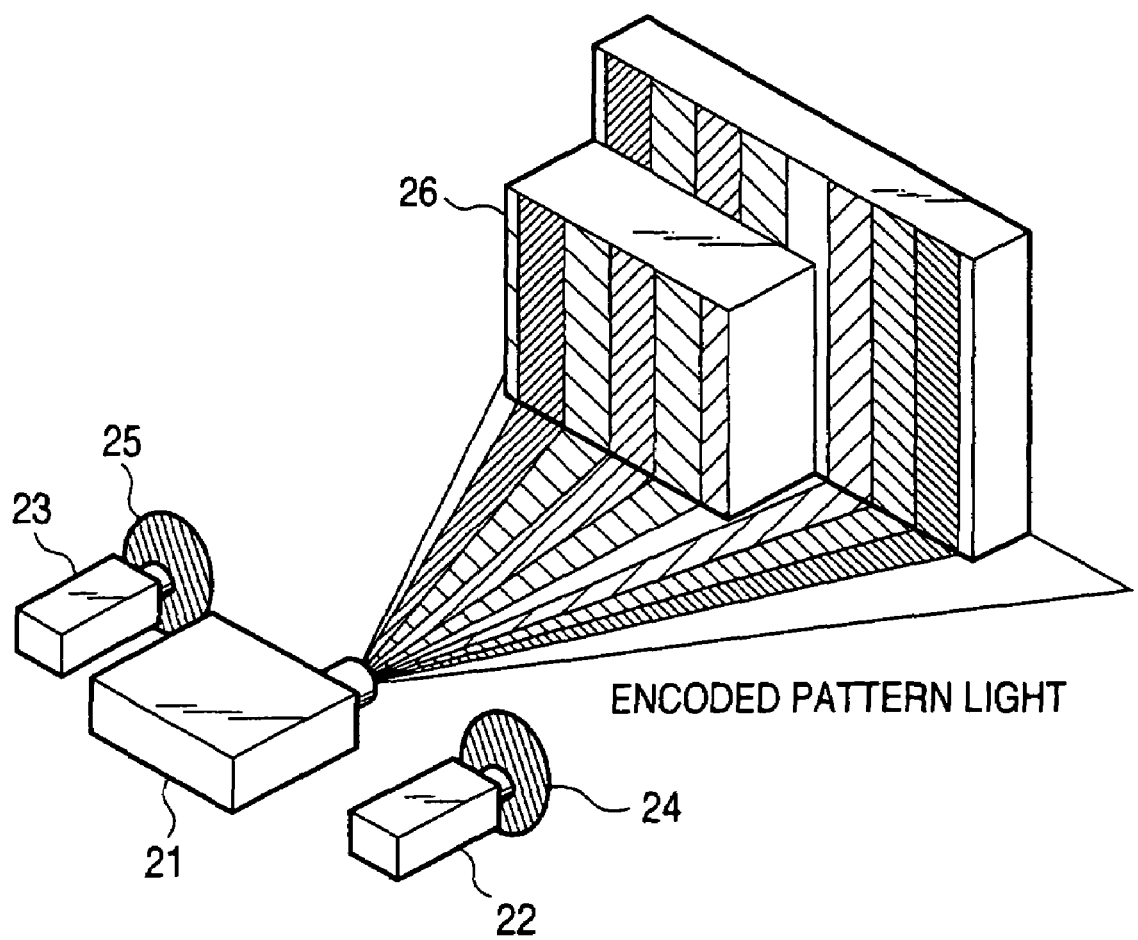
FIG. 1 is a configuration diagram of a range finder according to a first embodiment of the invention.

FIG. 1 is a configuration diagram showing a first embodiment of the invention. In FIG. 1, a range finder according to this embodiment includes a linearly polarized light projector system 21 for projecting linearly polarized light, two image input systems (a first image input system 22 and a second image input system 23), two polarizing filters 24 and 25 each functioning as a polarizing direction selection unit for selecting only light having one polarizing direction, and a personal computer (not shown). The personal computer is a device for controlling the projector system 21 and the first and second image input systems 22 and 23 and displaying a 3D image obtained thus. The polarizing filters 24 and 25 are disposed in front of the two image input systems 22 and 23 respectively. The reference numeral 26 designates a subject to acquire a 3D image.

Figure 2:
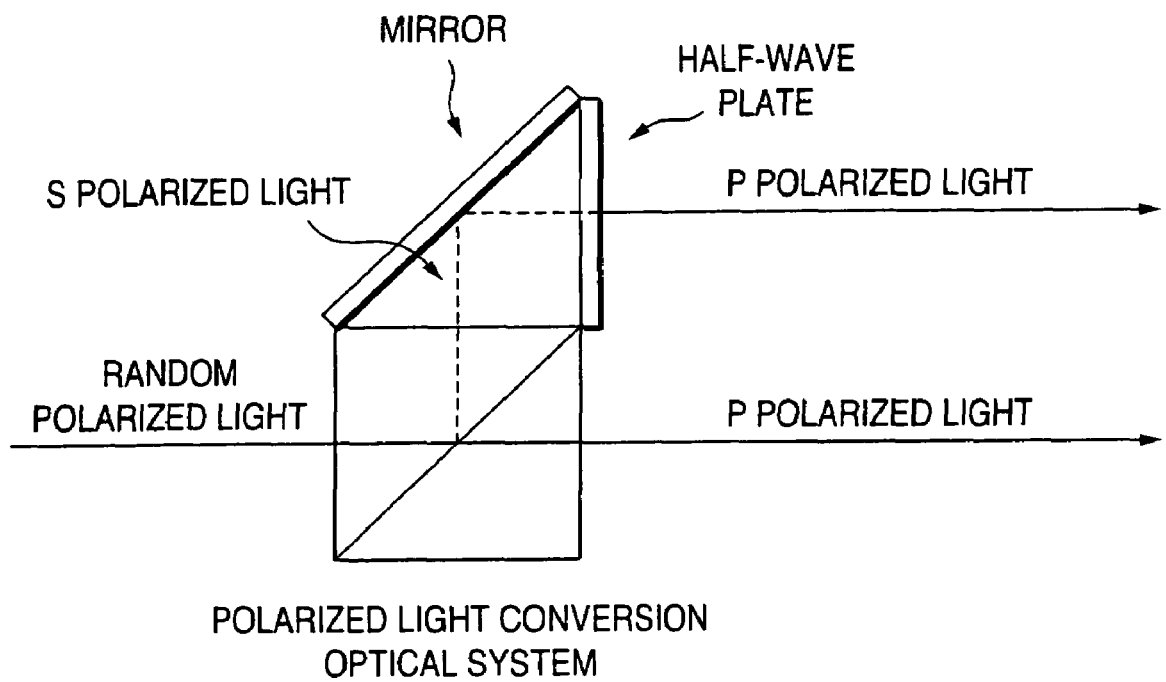
FIG. 2 is a diagram for explaining an example of a polarized light conversion optical system used in this embodiment.

The linearly polarized light projector system 21 includes a light source, a light forming optical system, and a polarized light conversion optical system. The light source has a lamp such as a halogen lamp or a xenon lamp, and a reflector for collecting beams emitted from the lamp. The light forming optical system has a condenser lens, an optical integrator, etc. which are generally used in a liquid-crystal projector. The polarized light conversion optical system has a PBS (Polarized Beam Splitter) prism, a half-wave plate, etc. Natural light (random polarized light) emitted from the light source is efficiently converted into light (linearly polarized light) having a single polarizing direction by the polarized light conversion optical system. For example, this conversion is performed as shown in FIG. 2.

That is, when random polarized light enters the polarized light conversion optical system, the random polarized light is separated into P polarized light (moving straightly) and S polarized light (moving perpendicularly to a direction of the movement of the random polarized light) by a polarized light separation film. The S polarized light is bent at 90 degrees by a total reflection mirror and then converted into P polarized light by the half-wave plate so that P polarized light, which is consented from the S polarized light is output in the same direction as the direction of movement of the above P polarized light separated by the polarized light separation film. In this manner, it can be said that the polarized light conversion optical system is an excellent conversion system because the efficiency of utilizing random polarized light converted into linearly polarized light exhibits a high value of about 90%.

Linearly polarized light generated to have a plurality of stripes encoded by the intensity or color of the light is projected onto the subject by the linearly polarized light projector system.

Light bulbs using liquid-crystal panels or the like may be used for forming the encoded striped light. Or a film or glass plate having a plurality of stripes different in transmittance or color may be used for forming the encoded striped light. Or a half-wave plate (not shown) may be provided newly on the light output side of the polarized light conversion optical system shown in FIG. 2. This half-wave plate can serve also as a unit used for adjusting the polarizing direction of the linearly polarized projected light as will be described later.

(A high-sensitive image pick-up camera is used as each image input system. A polarizing filter functioning as a analyzer is used as each polarizing direction selection unit.)

A mechanism of reduction of measurement error according to this embodiment will be described below with reference to FIG. 3. Linearly polarized light formed to have a plurality of encoded stripes is projected onto the subject by the linearly polarized light projector system 21 (projected light: linearly polarized light). The state of reflection of light on a surface of the subject varies widely according to the surface state of the subject. When the subject is made of an object such as paper, gypsum or ceramics, the reflected light is dominated by a diffuse reflected light component because the surface of the subject substantially serves as a lambertian surface. On the other hand, when the subject is made of a gloss-coated member, plastics, a surface-coated wooden member, satin-coated member as commonly used in OA products, a metal surface processed by hair-line finish or satin finish, a flat metal surface, the reflected light component contains specular-reflected light in addition to the diffuse reflected light component. As a result, the spatial distribution of reflection of light is biased. As the glossiness of each member surface increases, the ratio of the intensity of the specular-reflected light to the total intensity of the reflected light increases and the bias in the spatial distribution of reflection of light increases. This phenomenon appears mainly in a direction of specular reflection with respect to a direction of incidence of the projected light. Both specular-reflected light and diffuse-reflected light are observed in the direction of specular reflection so that the intensity of the specular-reflected light increases but the intensity of the diffuse-reflected light decreases as the glossiness increases. The linearly polarized state of the projected light is retained in the specular-reflected light in the direction of specular reflection (i.e., the specular-reflected light is linearly polarized light) but the diffuse-reflected light changes to random polarized light which exhibits random polarizing directions.

In the condition that the view point of the image input system A is set in the direction of specular reflection, a reflected image is captured. A polarizing filter is disposed in front of the image input system A. The polarizing filter is adjusted by rotation so that a transmission axis of the polarizing filter is approximately perpendicular to the polarizing direction of specular-reflected light. Alternatively, the linearly polarized light projector system may be adjusted by rotation around the center of projection while the angle of rotation of the polarizing filter is fixed. Only a reflected image based on part of diffuse-reflected light having a polarizing direction identical to the transmission axis of the polarizing filter can be captured by the image input system A because specular-reflected light is cut by the polarizing filter.

Polarizing filters are disposed in front of the image input systems B and C respectively. The polarizing filters are adjusted in the same manner as in the case of the image input system A so that a transmission axis of each polarizing filter is approximately perpendicular to the polarizing direction of specular-reflected light. Each of the image input systems B and C can also capture only a reflected image based on part of diffuse-reflected light having a polarizing direction identical to the transmission axis of the polarizing filter. When the gloss of the subject is relatively low, part of specular-reflected light is spread also in the direction of the view point B because the spatial distribution of specular-reflected light is widened. For the same reason as in the case of the image input system A, only a reflected image based on part of diffuse-reflected light having a polarizing direction identical to the transmission axis of the polarizing filter can be however captured by the image input system B.

The reflected striped images acquired in the this manner are reflected images based on the same and one striped light at the view points A, B and C and striped images are name in the level of brightness or color whereas reflected striped images acquired by the related-art apparatus are widely different in the level of intensity or color. Accordingly, when striped images acquired by left and right image input systems are compared with each other so that corresponding points on the subject can be decided on the basis of the intensity or color difference between the striped images, the corresponding points can be decided accurately.

Figure 4:
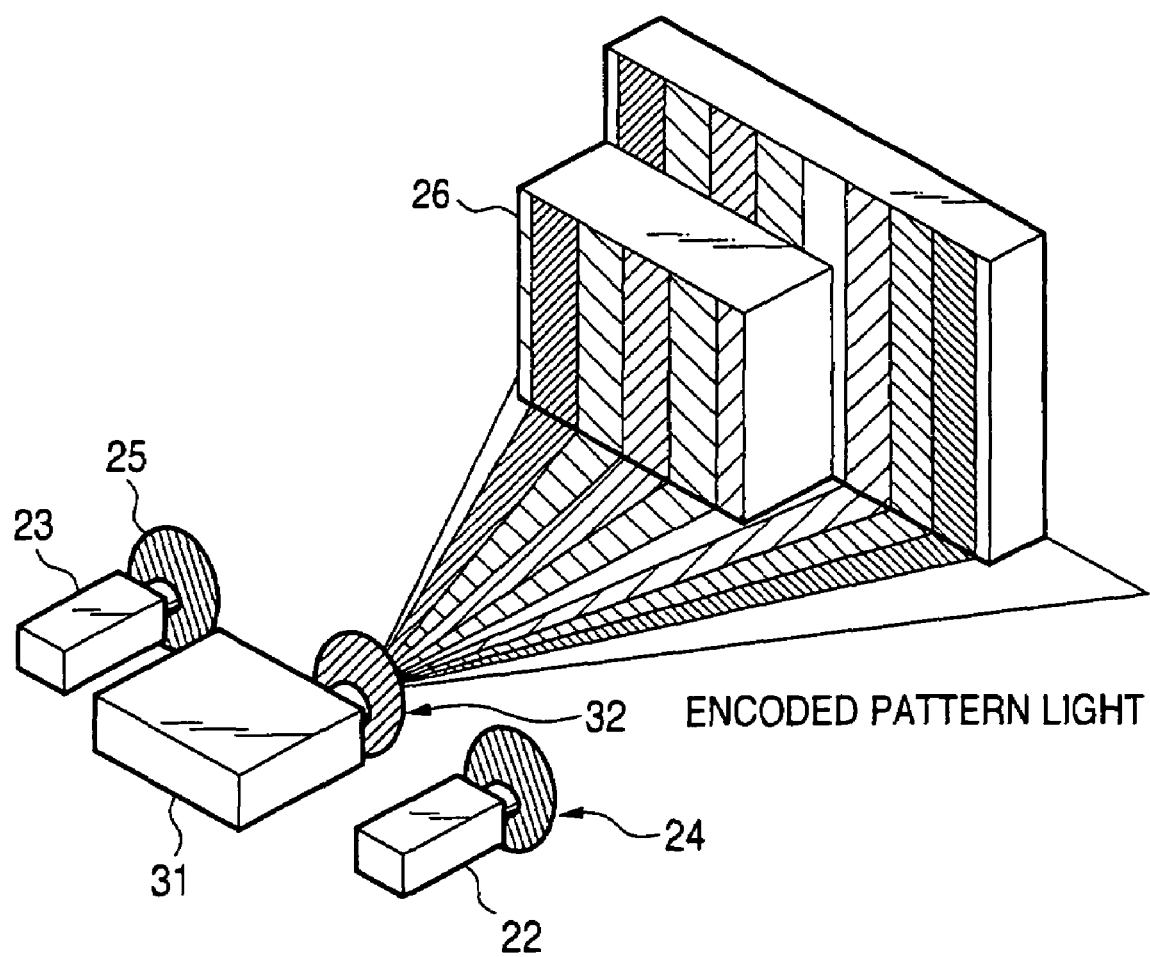
FIG. 4 is a configuration diagram of a range finder according to a second embodiment of the invention.

FIG. 4 shows a second embodiment of the invention. A linearly polarized light projector system 31 includes a light source (not shown), a light forming optical system (not shown), and a polarizing filter 32. Light projected from the light source is natural light (random polarized light) which exhibits random polarizing directions. Only a single polarizing direction is selected by the polarizing filter 32 to thereby form the linearly polarized light projector system 31. This embodiment is characterized in that the linearly polarized light projector system 31 can be produced compactly and inexpensively compared with the first embodiment, and that the polarizing filter 32 disposed in front of the projector system can be used for rotationally adjusting the polarizing direction easily. It can be said that the configuration according to this embodiment is adapted to a small-size light-weight low-cost system. The light forming optical system may be dispensed with. In this case, a system smaller in size, lighter in weight and lower in cost can be produced.

Although the first and second embodiments have been described on the case where the apparatus has two image input systems, the invention may be also applied to the case where the apparatus has only one image input system. In this case, correspondence between the projected light and the captured reflected image must be taken.

Although the first and second embodiments have been described on the case where light having a single polarizing direction is used as the linearly polarized light, the invention may be also applied to the case where light having a plurality of polarizing directions is used. In the polarized light conversion optical system in the first embodiment, after random polarized light is split into P polarized light and S polarized light, the S polarized light is converted into P polarized light by the half-wave plate. The half-wave plate may be dispensed with because of limitation to the cost or size of the apparatus so that both P polarized light and S polarized light having polarizing directions perpendicular to each other are projected as they are. In this case, the angle between the polarizing direction of specular-reflected light and the transmission axis of the polarizing filter is adjusted so that the transmission axis of the polarizing filter does not coincides with the polarizing direction of specular-reflected light corresponding to the P/S polarized light.

Although the first and second embodiments have been described on the case where the projected pattern encoded by the intensity or color of light is constituted by a plurality of stripes arranged horizontally, the invention is not limited thereto. For example, the projected pattern encoded by the intensity or color of light and separated into a plurality of stripes arranged vertically may be used.

In the first and second embodiments, intensity information of the subject can be acquired in addition to the measurement of the shape of the subject. In the condition that the encoded pattern is switched over to white light, the light is projected onto the subject. Or optimal illumination light is applied onto the subject by an external illuminator without use of the projector system. In a state in which the texture of the subject is improved in this manner, intensity information of the subject is acquired by the apparatus according to this embodiment. As a result, intensity information as well as range information can be acquired, so that data used for producing 3D contents while displaying intensity data stuck to range data of the subject can be provided.

Figure 5:
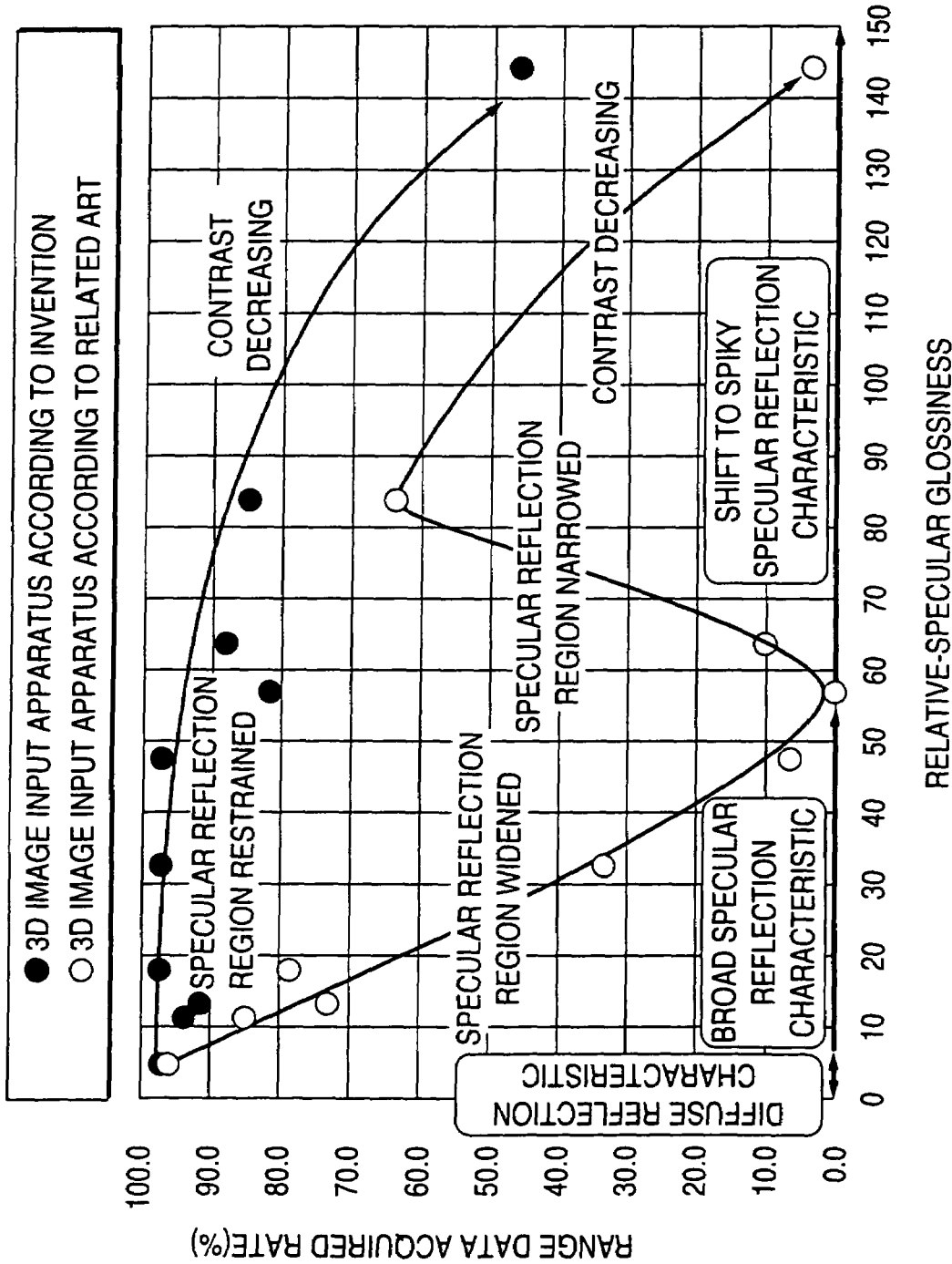
FIG. 5 is a graph showing the effect of the invention in comparison with a range finder according to the related art.

FIG. 5 is a graph showing the effect of the first embodiment of the invention in comparison with the related-art range finder. In the graph, the horizontal axis shows relative-specular glossiness, and the vertical axis shows range data acquired rate. The relative-specular glossiness is defined on the assumption that luminous flux reflected in a direction of specular reflection is proportional to glossiness. That is, the relative-specular glossiness is expressed in the rate of luminous flux reflected in a direction of specular reflection to luminous flux reflected on a standard plane. When the glossiness Gos of the standard plane (glass with a refractive index of 1.567) is 100, the relative-specular glossiness Gs of a sample is given by the following expression:

$$Gs = (Gos/\phi os) \cdot \phi s$$

in which $\phi os$ is luminous flux reflected on the standard plane, and $\phi s$ is luminous flux reflected on the sample.

A gloss checker IG-330 made by Horiba, Ltd. is used as a measuring device.

The range data acquired rate is expressed in the rate of the number of measured distance pixels to the total number of pixels on a measurement place of the image captured by the image input system. In a reflecting surface of gypsum, paper or the like having a relative-specular glossiness of not higher than 10 and dominated by diffuse reflection characteristic, a high range data acquired rate can be obtained in each of the range finder according to the first embodiment of the invention and the related-art range finder. In the related-art range finder, it is however impossible to measure the shape of the subject because the range data acquired rate decreases rapidly as the relative-specular glossiness increases, that is, because the range data acquired rate is approximately zero when the relative-specular glossiness is about 60. As the relative-specular glossiness increases to be higher than 60, the range data acquired rate is more or less recovered and then decreases again. On the contrary, in the range finder according to the invention, a high range data acquired rate of not lower than 80% is achieved in the whole relative-specular glossiness range up to about 100. This is because specular-reflected light reflected on the glossy surface can be removed in the relative-specular glossiness range up to about 100 by the polarizing optical system according to the invention so that the specular reflection region can be restrained. As the relative-specular glossiness increases to be higher than 100, the range data acquired rate decreases slowly. This is because diffuse-reflected light decreases so that the contrast of the reflected image captured by the image input system is reduced extremely. If the contrast of the captured striped image is reduced, the intensity or color difference between the stripes is reduced so that the accuracy in extraction of corresponding points becomes too low to acquire the range data. The reason why the range data acquired rate increases temporarily after the relative-specular glossiness of about 60 in the related-art range finder is that the reflection characteristic of the glossy substance shifts from broad specular reflection characteristic having a broad reflection region of specular-reflected light to spiky reflection characteristic having a narrow reflection region of specular-reflected light. When the reflection characteristic shifts to such spiky reflection characteristic, accuracy in extraction of corresponding points increases temporarily because the specular reflection region decreases (i.e., the diffuse reflection region increases).

Figure 6:
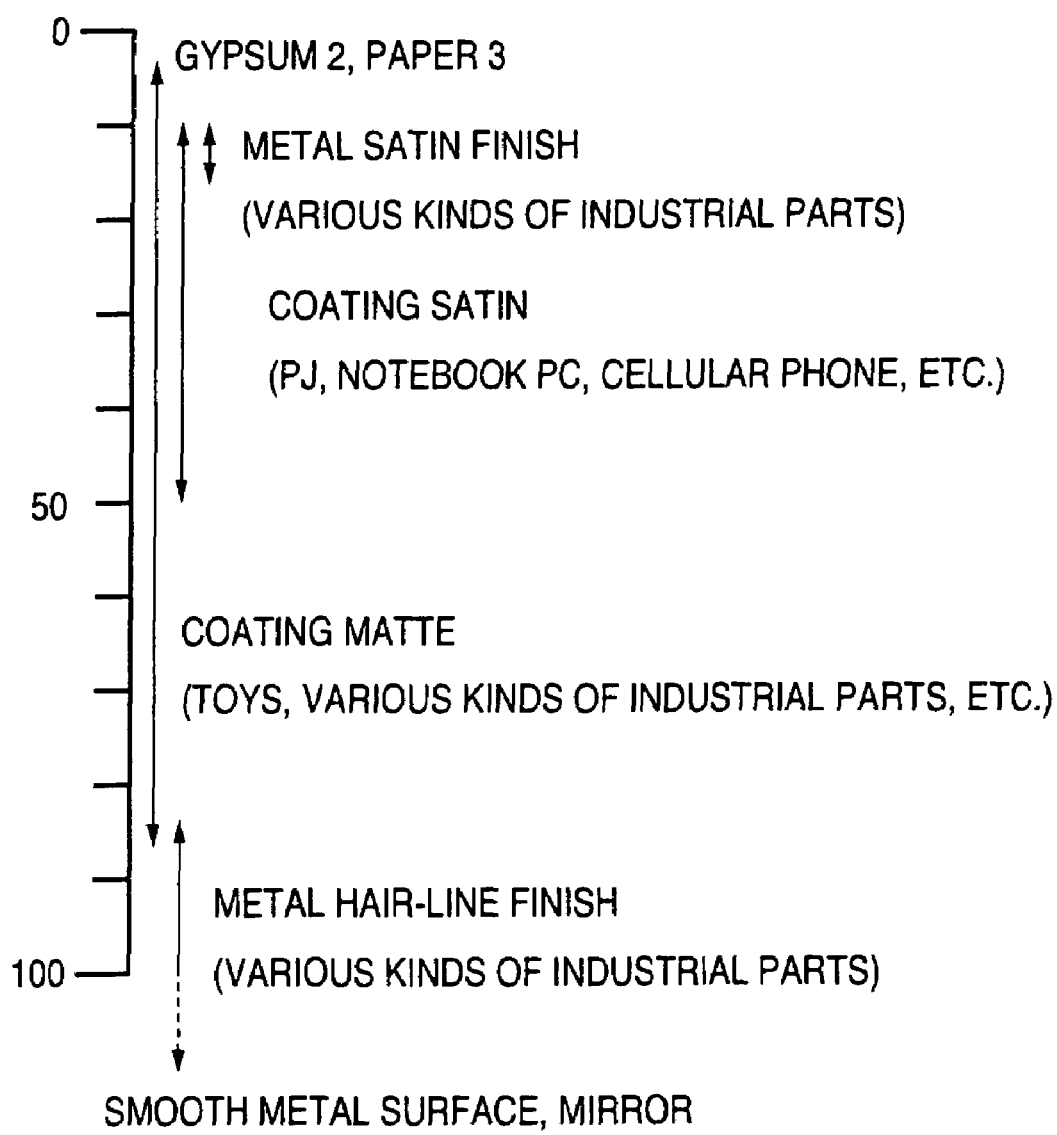
FIG. 6 is a diagram showing an example of relative-specular glossiness of surfaces of various kinds of materials.

As shown in FIG. 6, low gloss substances such as gypsum and paper; satin-finished metal products used in various kinds of industrial parts; satin-coated products used in surface coating of projectors, notebook PCs, and cellular phones; matte-coated products used in toys and various kinds of industrial parts; surface-coated wooden or plastic members; hair-line-finished metal products used in various kinds of industrial parts; etc. are arranged in a relative-specular glossiness range of from 0 to 100. According to the embodiment of the invention, the range data of these subjects can be acquired well, and intensity data can be acquired in addition to the range data. Accordingly, when 3D contents need to be produced, the range of the subject intended for the contents is widened greatly. As a result, there is a large merit that the production time which was long in 3DCG can be shortened.

A third embodiment of the invention will be described below. In the third embodiment and a fourth embodiment which will be described later, an image input system having a principal point identical to the principal point of the projector system is used.

Figure 7:
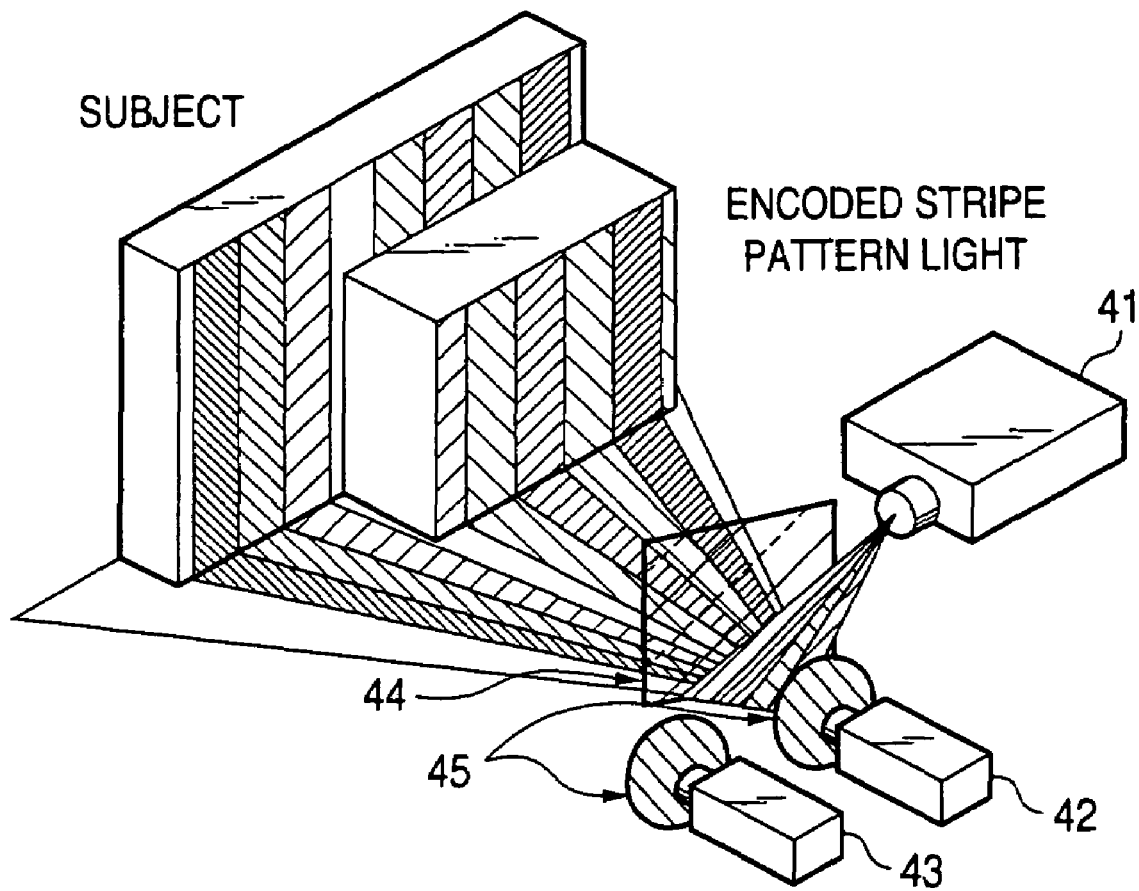
FIG. 7 is a configuration diagram of a range finder according to a third embodiment of the invention.

FIG. 7 is a configuration diagram showing the third embodiment of the invention. In FIG. 7, the range finder according to this embodiment has a projector unit (linearly polarized light projector system) 41 for projecting linearly polarized light onto a subject, an identical principal point image input unit (e.g., an identical principal point camera) 42 disposed in a position substantially identical to the position of the principal point of the projector unit 41, a nonidentical principal point image input unit (e.g., a nonidentical principal point camera) 43 disposed in a position not identical to the position of the principal point of the projector unit 41, a half mirror 44 for disposing the projector unit 41 and the identical principal point image input unit 42 in the position of the optically identical principal point, polarizing direction selection units (e.g., polarizing filters) 45 disposed in front of the identical and nonidentical principal point image input units 42 and 43 for selecting light having a polarizing direction, and a personal computer (not shown). The personal computer is a device for controlling the projector unit 41 and the identical and nonidentical principal point image input units 42 and 43 and displaying a 3D image obtained.

The same configuration as shown in FIG. 1 can be applied to the linearly polarized light projector system (projector unit 41) for projecting linearly polarized light. That is, the projector unit 41 includes a light source, a light forming optical system, and a polarized light conversion optical system. The light source has a lamp such as a halogen lamp or a xenon lamp, and a reflector for collecting beams emitted from the lamp. The light forming optical system has a condenser lens, and an optical integrator which are generally used in a liquid-crystal projector. The polarized light conversion optical system has a PBS prism, and a half-wave plate. Natural light (random polarized light) emitted from the light source is efficiently converted into linearly polarized light having a single polarizing direction by the polarized light conversion optical system.

A high-sensitive image input camera is used as each of the identical and nonidentical principal point image input units 42 and 43. A polarizing filter functioning as an analyzer is used as each polarizing direction selection unit.

A mechanism of reduction of measurement error according to this embodiment will be described below. The case where the subject is textured will be described first.

Encoded stripe pattern light projected by the projector system is monitored by the identical and nonidentical principal point cameras. Striped images captured by the identical and nonidentical principal point cameras respectively are compared with each other to thereby extract corresponding stripes and calculate distances according to the trigonometrical theory. Because the identical principal point camera is disposed in a position identical to the position of the principal point of the projector system, the striped image captured by the identical principal point camera is not disturbed by the shape of the subject so that the striped image can be observed in the same manner as the projected striped light. Each of the striped images captured by the identical and nonidentical principal point cameras contains color/brightness change information based on the texture of the subject. Accordingly, error can be restrained from being caused by the texture of the subject when the two images are compared with each other to calculate distances.

Figure 8:
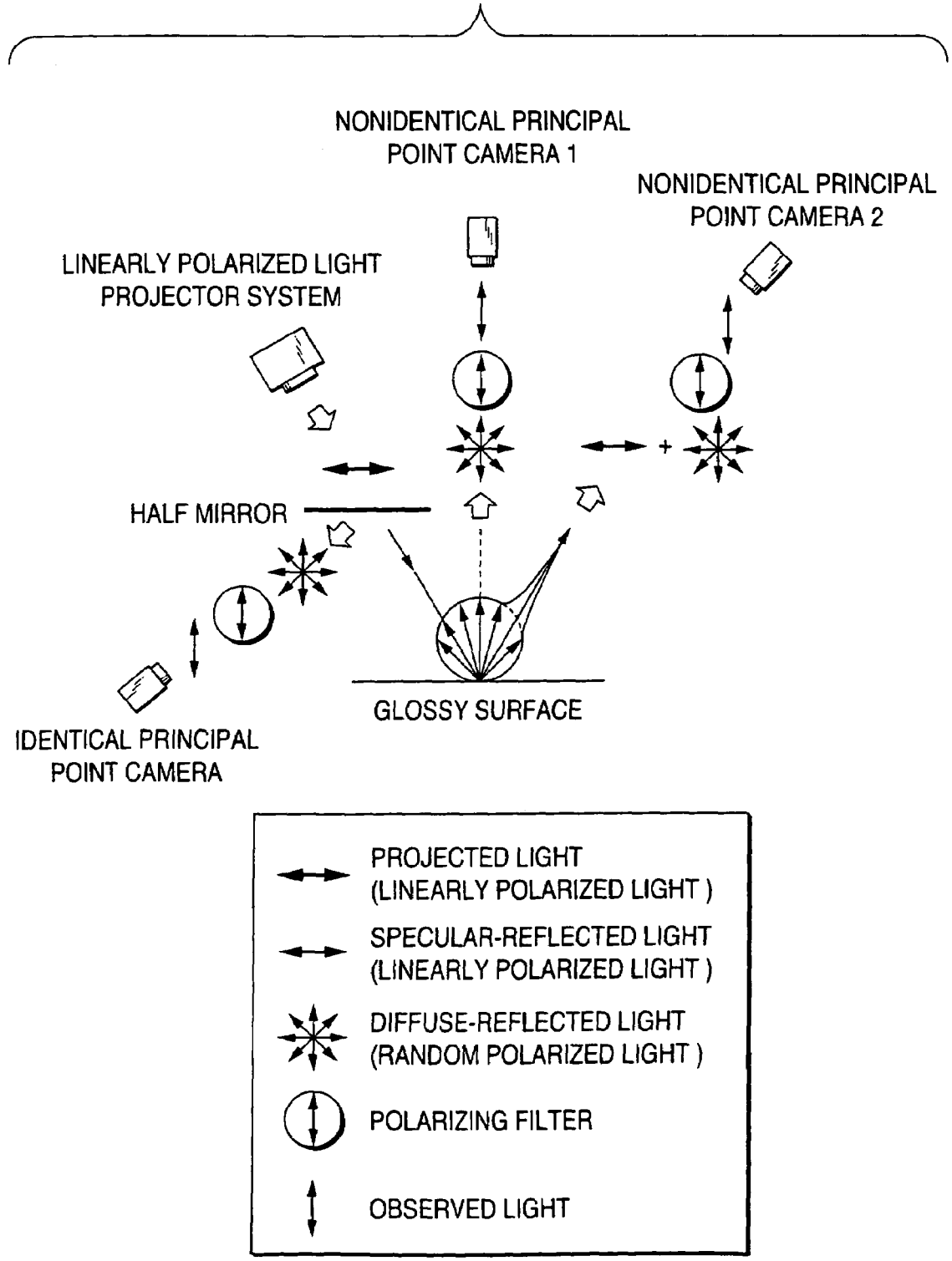
FIG. 8 is a diagram for explaining a mechanism of reducing measurement error in this embodiment.

The case where the subject is glossy will be described below with reference to FIG. 8. This case is basically equivalent to the first and second embodiments.

A linearly polarized light projector system is used for forming linearly polarized light and projecting encoded light with a plurality of stripes onto a subject (projected light: linearly polarized light). Polarizing filters are disposed in front of an identical principal point camera and nonidentical principal point cameras 1 and 2 respectively. Each polarizing filter is rotationally adjusted so that the transmission axis of the polarizing filter is substantially perpendicular to the polarizing direction of the linearly polarized light projected thus. Striped images captured by the identical principal point camera and the nonidentical principal point camera 1 respectively or by the identical principal point camera and the nonidentical principal point camera 2 respectively are compared with each other to thereby extract corresponding stripes and calculate distances according to the trigonometrical theory. When the measurement surface is glossy, the intensity distribution of light reflected on the measurement surface varies widely. This is because light reflected in a direction of specular reflection contains specular-reflected light in addition to diffuse-reflected light. The reflected light intensity distribution is biased as shown in FIG. 8. On the other hand, when the view point is out of the direction of specular reflection, the specular-reflected light is reduced or eliminated. The diffuse-reflected light is uniform regardless of the view point. The linearly polarized state of the projected light is retained in the specular-reflected light in the direction of specular reflection. That is, the specular-reflected light is constituted by linearly polarized light. On the other hand, the diffuse-reflected light shifts to random polarized light having random polarizing directions. Accordingly, the specular-reflected light is cut by the polarizing filter in front of the nonidentical principal point camera 2 disposed in the direction of specular reflection, so that only part of diffuse-reflected light having a direction identical to the transmission axis of the polarizing filter enters the nonidentical principal point camera 2. Only part of diffuse-reflected light having a direction identical to the transmission axis of the polarizing filter in front of each of the identical principal point camera and the nonidentical principal point camera 1 enters the image input cameras, the identical principal point camera and the nonidentical principal point camera being disposed in a direction other than the direction of specular reflection. Accordingly, when linearly polarized light is used as the projected light while the transmission axis of each polarizing filter is adjusted in the this manner, a striped image after removal of specular-reflected light can be captured by each camera regardless of the view point of the camera. Accordingly, error can be restrained from being caused by the gloss of the subject when two striped images captured by the identical principal point camera and the nonidentical principal point camera 1 respectively or by the identical principal point camera and the nonidentical principal point camera 2 respectively are compared with each other to calculate distances.

Although this embodiment has been described on the case where the transmission axis of each polarizing filter is rotationally adjusted so as to be substantially perpendicular to the polarizing direction of the linearly polarized light projected thus, the invention may be also applied to the case where the linearly polarized light projector system is adjusted so as to be rotated around the center of projection while each polarizing filter is fixed. Alternatively, only the half-wave plate provided on the light output side of the polarized light conversion optical system which has been already described may be rotationally adjusted.

Figure 9:
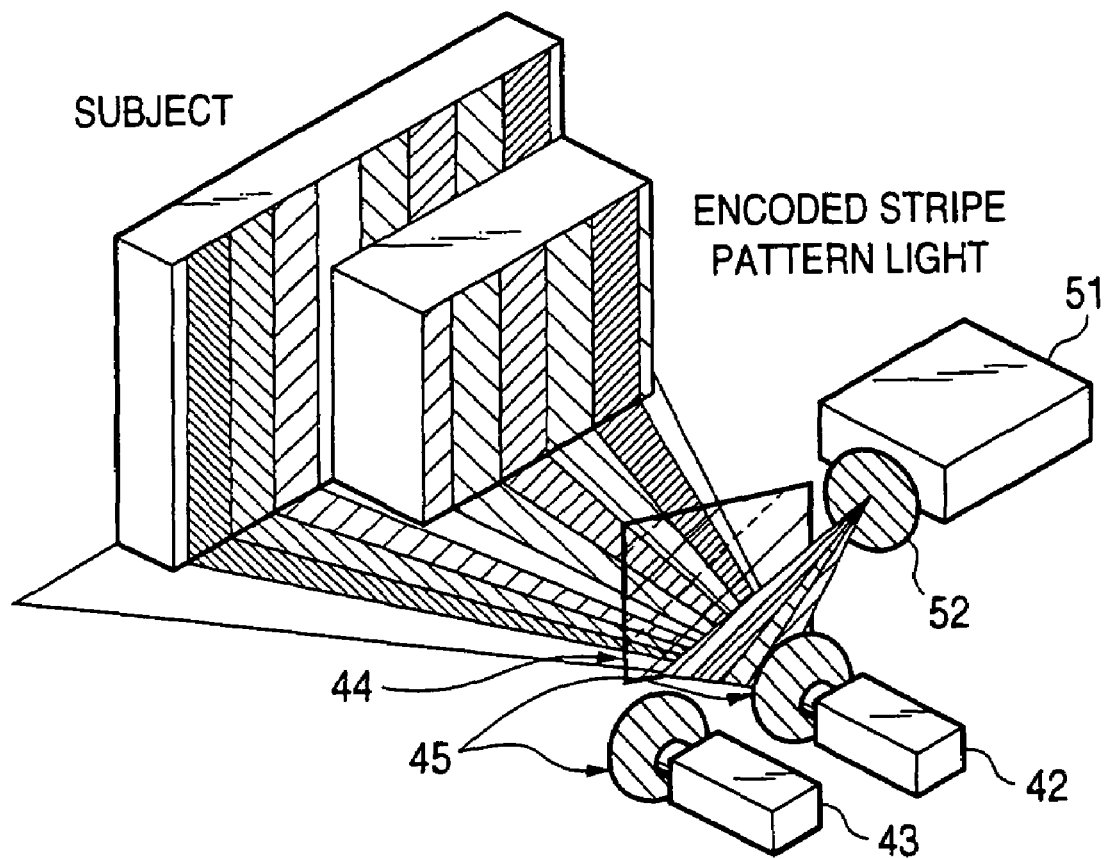
FIG. 9 is a configuration diagram of a range finder according to a fourth embodiment of the invention.

FIG. 9 shows a fourth embodiment of the invention. A linearly polarized light projector system 51 includes a light source (not shown), a light forming optical system (not shown), and a polarizing filter 52. Light emitted from the light source is natural light (random polarized light) having random polarizing directions. Only a single polarizing direction is selected by the polarizing filter 52 so that linearly polarized light is projected. This embodiment is characterized in that the linearly polarized light projector system can be produced compactly and inexpensively compared with the third embodiment, and that the polarizing filter disposed in front of the projector system can be used for adjusting the polarizing direction easily. It can be said that the configuration according to this embodiment is adapted to a small-size light-weight low-cost system. The light forming optical system may be dispensed with. In this case, a system smaller in size, lighter in weight and lower in cost can be produced.

Although the third and fourth embodiments have been described on the case where projected light having a single polarizing direction is used as the linearly polarized light, the invention may be also applied to the case where light having a plurality of polarizing directions is used. In the polarized light conversion optical system in the third embodiment, after random polarized light is split into P polarized light and S polarized light, the S polarized light is converted into P polarized light by the half-wave plate. The half-wave plate may be dispensed with because of limitation to the cost or size of the apparatus so that both P polarized light and S polarized light having polarizing directions perpendicular to each other are projected as they are. In this case, the angle between the polarizing direction of specular-reflected light and the transmission axis of the polarizing filter is adjusted so that the transmission axis of the polarizing filter does not coincides with the polarizing direction of specular-reflected light corresponding to the P/S polarized light.

Although the third and fourth embodiments have been described on the case where the stripe pattern encoded by the intensity or color of light is constituted by a plurality of stripes arranged horizontally, the invention is not limited thereto. For example, the pattern encoded by the intensity or color of light and separated into a plurality of stripes arranged vertically may be used.

In the third and fourth embodiments, intensity information of the subject can be acquired in addition to the measurement of the shape of the subject. In the condition that the encoded stripe pattern is switched over to white light, the light is projected onto the subject. Or optimal illumination light is applied onto the subject by an external illuminator without use of the projector system. In a state in which the texture of the subject is improved in this manner, intensity information of the subject is acquired by the apparatus according to this embodiment. As a result, intensity information as well as range information can be acquired, so that data used for producing 3D contents while displaying intensity data stuck to range data of the subject can be provided.

Figure 10:
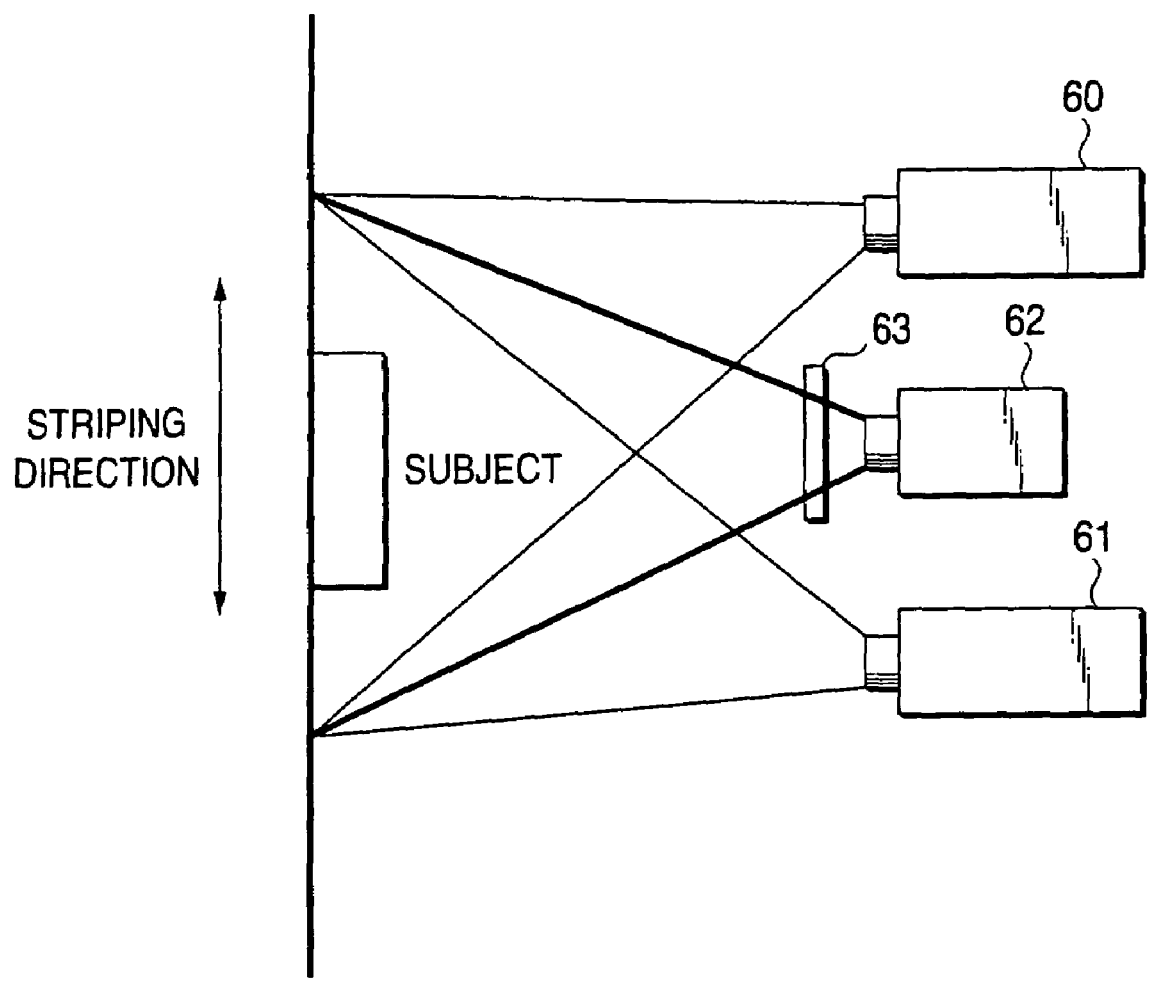
FIG. 10 is a diagram for explaining a modified example of the third embodiment.
Figure 11:
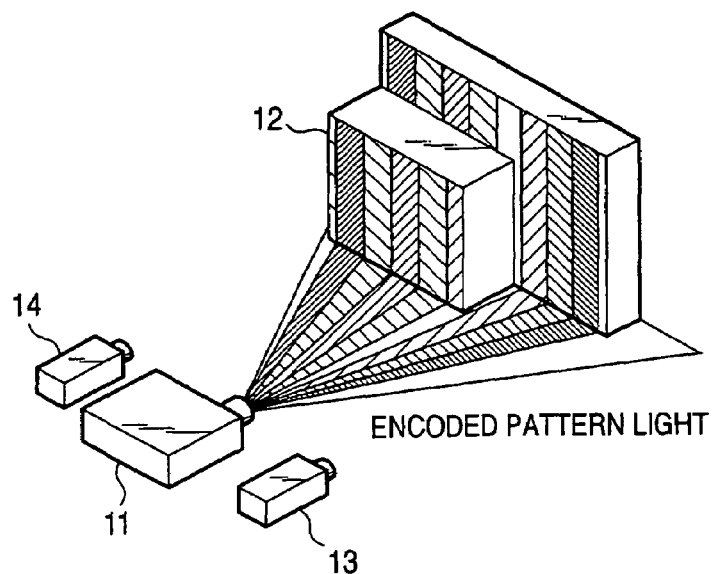
FIG. 11 is a configuration diagram of a range finder according to the related art.
Figure 12:
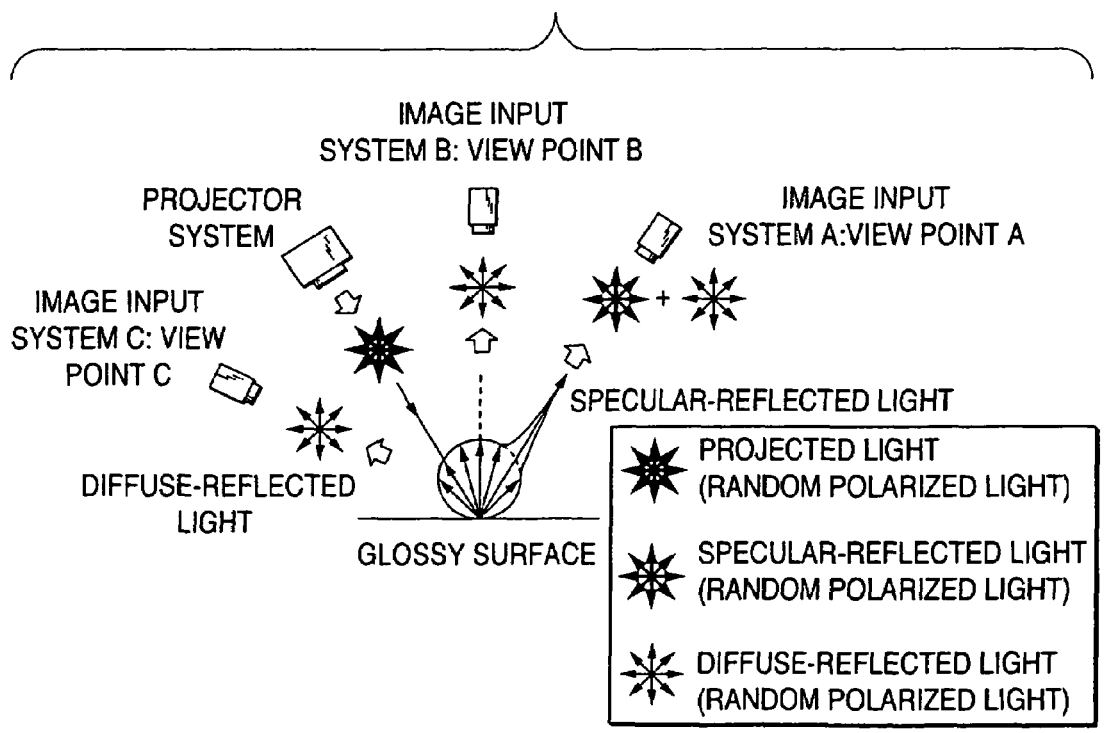
FIG. 12 is a diagram for explaining a mechanism of occurrence of measurement error in the range finder according to the related art.
Figure 13:
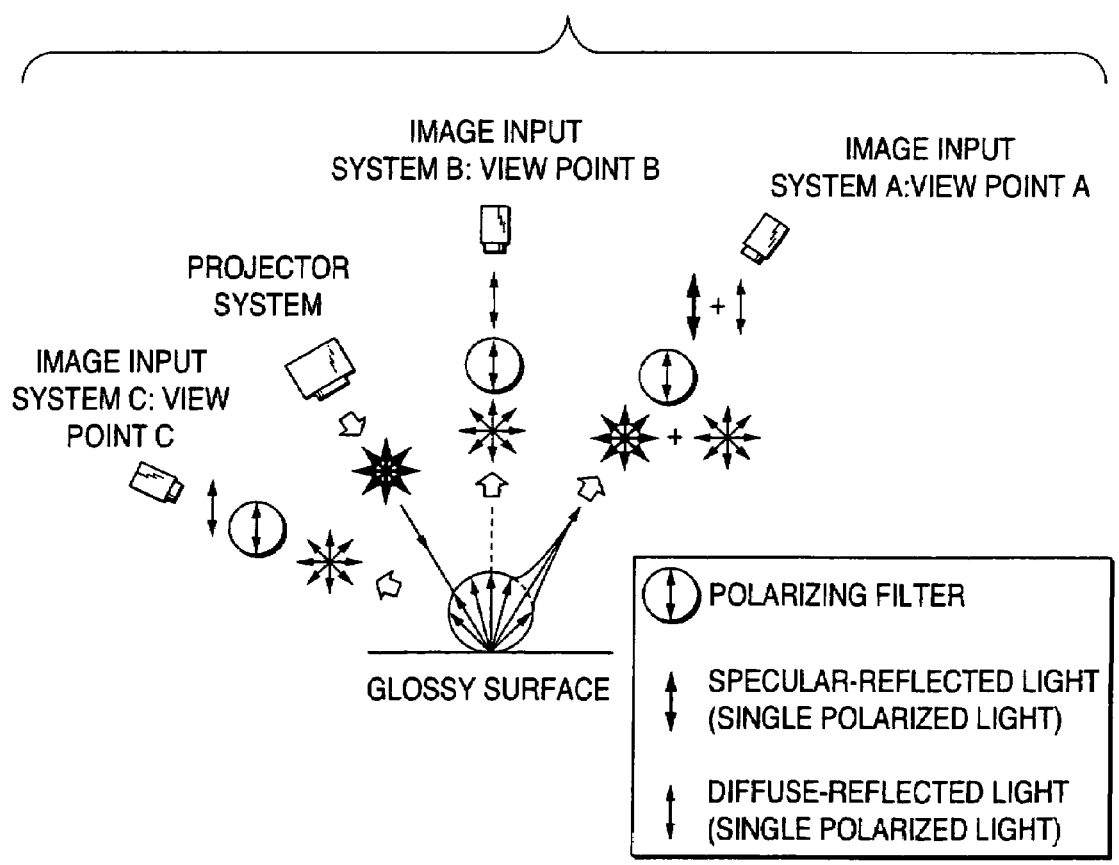
FIG. 13 is a configuration diagram of another range finder according to the related art.
Figure 14:
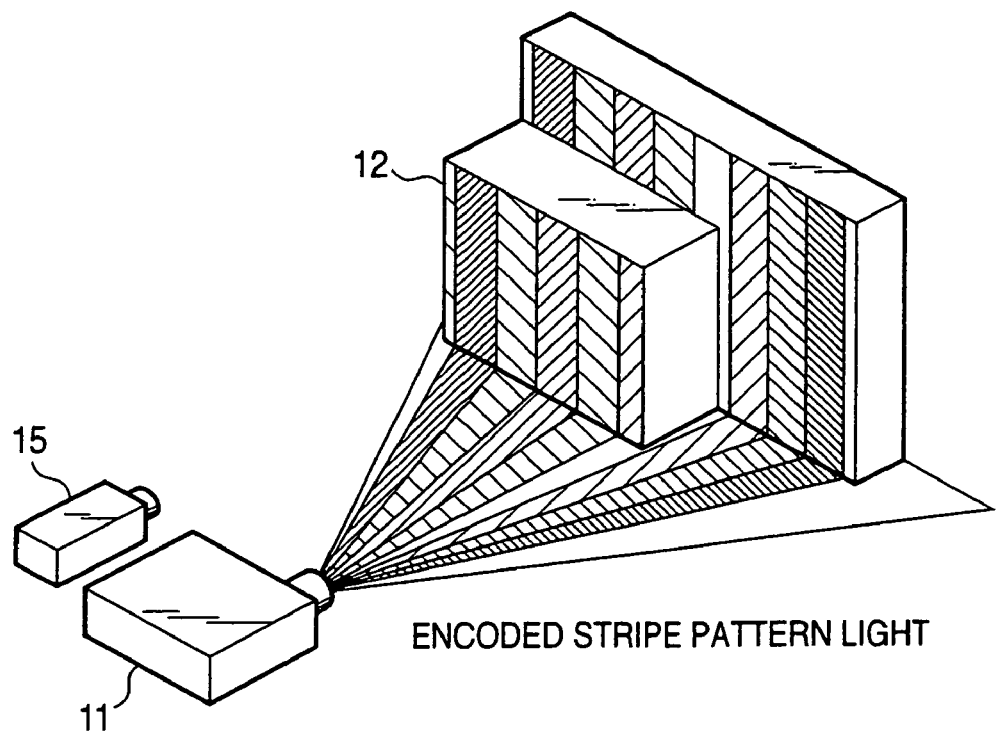
FIG. 14 is a configuration diagram of a range finder according to the related art in the case where the principal point of an image input system is not identical to that of a projector system.
Figure 15:
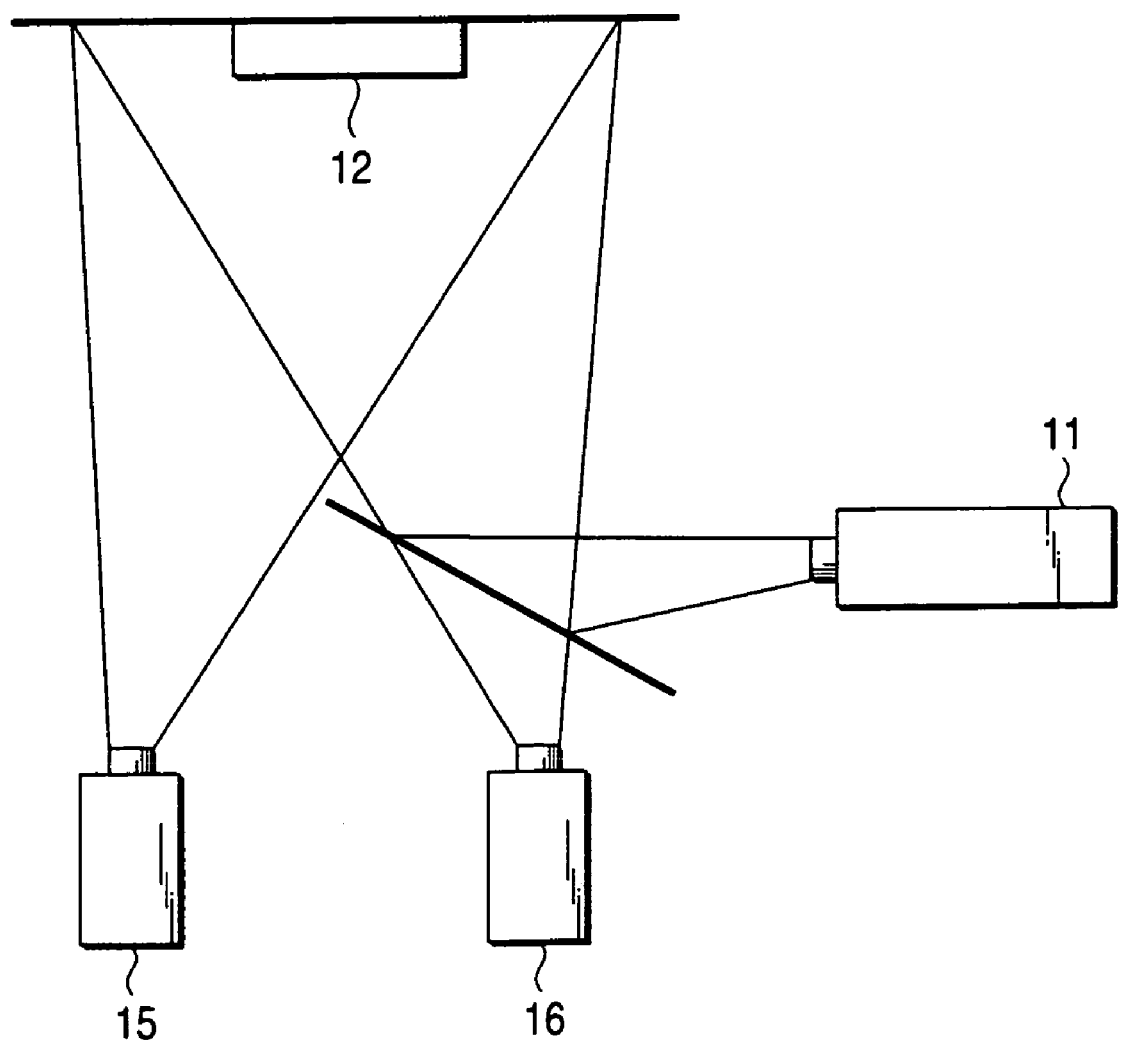
FIG. 15 is a diagram showing an example of configuration of a range finder using an identical principal point image input system according to the related art.

As shown in FIG. 10, a plurality of linearly polarized light projector systems 60 and 61 may be provided so that the principal points of the linearly polarized light projector systems 60 and 61 are aligned with the principal point of an identical principal point camera 62 in a striping direction. The configuration of the invention can be applied to this case. There is no nonidentical principal point camera shown in FIG. 10. A polarizing filter 63 is provided in front of the camera 62. Also in this case, the same effect as described above can be achieved. Incidentally, only one of the upper and lower linearly polarized light projector systems shown in FIG. 10 may be used or three or more linearly polarized light projector systems may be aligned with the principal point of an identical principal point camera 62 in the striping direction. Although all the embodiments have been described on the case where a polarizing filter functioning as a transmission type polarizing direction selection unit is used as each polarizing direction selection unit, the invention may be also applied to the case where the polarizing filter is replaced by an optical member functioning as a reflection type polarizing direction selection unit. Examples of the optical member include a PBS prism, and a wire grid.

As described above, in accordance with the invention, a polarizing optical system is used so that the number of points for measuring a glossy subject can be increased and that range images improved in measurement accuracy can be acquired at one shot. For example, a range finder can be provided so that the time required for producing 3D contents can be reduced remarkably.

What is claimed is:
1. A range finder comprising:
a projector unit that projects linearly polarized light onto a subject;
one or more polarizing direction selection units, each of which selects light having a polarizing direction from light reflected by the subject;
a first image input unit, disposed in a position optically identical to the position of the principal point of the projector unit, where the first image input unit captures a first reflected image based on light reflected by the subject and selected by one of the polarizing direction selection units;

a second image input unit disposed in a position optically different from the position of the principal point of the projector unit, where the second image unit captures a second reflected image based on light reflected by the subject and selected by one of the polarizing direction selection units; and a determining unit that determines a distance to the subject based on the first reflected image and the second reflected image.

2. The range finder according to claim 1, wherein
the projector unit projects an encoded stripe pattern onto the subject; and
the first image input unit and the second image input unit are arranged to deviate from a line extending in a direction of a length of the stripe pattern.

3. The range finder according to claim 1, wherein the polarizing direction selected by the polarizing direction selection units is substantially perpendicular to the polarizing direction of the linearly polarized light in terms of angle.

4. The range finder according to claim 1, wherein the projector unit includes a light source, a light forming optical system, and a polarized light conversion optical system.

5. The range finder according to claim 1, wherein the projector unit includes a light source, a light forming optical system, and a polarizing filter.

6. The range finder according to claim 1, wherein each of the polarizing direction selection units comprises a polarizing filter.

7. The range finder according to claim 1, wherein the second image input unit comprises a plurality of image input units.

8. The range finder according to claim 1, further comprising:
an angle adjustment unit for changing an angle of the polarizing direction selected by the polarizing direction selection unit, relative to the polarizing direction of the linearly polarized light.

9. The range finder according to claim 8, wherein
the angle adjustment unit includes a rotation mechanism for rotating the projector unit.

10. The range finder according to claim 8, wherein the angle adjustment unit includes a rotation mechanism for rotating one or more of the polarizing direction selection units.

11. The range finder according to claim 8, wherein a reflected image based on light after specular-reflected light contained in the light reflected by the subject is removed by the angle adjustment unit is captured.

12. A 3D image acquisition method comprising:
projecting linearly polarized light onto a subject;
selecting light having a polarizing direction from light reflected by the subject;
acquiring the selected light at a position optically identical to the position of the principal point at which the projecting of the linearly polarized light is performed and a position optically different from the position of the principal point at which the projecting of the linearly polarized light is performed;
measuring a 3D shape of the subject on the basis of images generated from the acquired light; and
outputting the 3D shape of the subject.

* * * * *